United States Patent
Kwak et al.

(10) Patent No.: US 11,323,207 B2
(45) Date of Patent: May 3, 2022

(54) METHOD FOR HARQ ACK/NACK REPORTING IN WIRELESS COMMUNICATION SYSTEM AND APPARATUS THEREFOR

(71) Applicant: LG Electronics Inc., Seoul (KR)

(72) Inventors: Gyoungil Kwak, Seoul (KR); Yunjung Yi, Seoul (KR); Daesung Hwang, Seoul (KR); Sukhyon Yoon, Seoul (KR); Joonkui Ahn, Seoul (KR); Hyunho Lee, Seoul (KR); Hanbyul Seo, Seoul (KR); Hanjun Park, Seoul (KR); Changhwan Park, Seoul (KR)

(73) Assignee: LG Electronics Inc., Seoul (KR)

( * ) Notice: Subject to any disclaimer, the term of this patent is extended or adjusted under 35 U.S.C. 154(b) by 136 days.

(21) Appl. No.: 16/637,479

(22) PCT Filed: Aug. 9, 2018

(86) PCT No.: PCT/KR2018/009131
§ 371 (c)(1),
(2) Date: Feb. 7, 2020

(87) PCT Pub. No.: WO2019/031893
PCT Pub. Date: Feb. 14, 2019

(65) Prior Publication Data
US 2020/0252167 A1 Aug. 6, 2020

Related U.S. Application Data

(60) Provisional application No. 62/544,669, filed on Aug. 11, 2017, provisional application No. 62/543,960, filed on Aug. 10, 2017.

(51) Int. Cl.
*H04L 1/18* (2006.01)
*H04W 72/04* (2009.01)

(52) U.S. Cl.
CPC ....... *H04L 1/1812* (2013.01); *H04W 72/0413* (2013.01)

(58) Field of Classification Search
CPC ................. H04L 1/1812; H04W 72/0413
See application file for complete search history.

(56) References Cited

U.S. PATENT DOCUMENTS

2008/0117891 A1   5/2008   Damnjanovic et al.
2010/0029322 A1   2/2010   Englund et al.
(Continued)

OTHER PUBLICATIONS

Sassioui et al. "HARQ and AMC: Friends or Foes ?" IEEE Trans on Communications Feb. 2017 (Year: 2017).*

(Continued)

*Primary Examiner* — Jeffrey M Rutkowski
*Assistant Examiner* — Basil Ma
(74) *Attorney, Agent, or Firm* — Dentons US LLP

(57) ABSTRACT

A method by which a terminal reports hybrid automatic repeat request (HARQ) acknowledgment/negative acknowledgment (ACK/NACK) feedback in a wireless communication system, according to one embodiment of the present disclosure, comprises the steps of: detecting downlink data; and transmitting HARQ ACK/NACK information for the downlink data, wherein the HARQ ACK/NACK information can include a bit selected from a HARQ ACK/NACK bit information group in which the number of states of a bit indicating ACK and the number of states of a bit indicating NACK are different.

12 Claims, 13 Drawing Sheets

(a) Conventional 1-bit ACK/NACK decision region (b) Proposed 1-bit ACK/NACK decision region

(56) References Cited

U.S. PATENT DOCUMENTS

| | | | |
|---|---|---|---|
| 2010/0113007 A1* | 5/2010 | Fukuoka | H04L 27/34 455/423 |
| 2014/0301257 A1* | 10/2014 | Bebawy | H04L 1/0073 370/311 |
| 2016/0352551 A1 | 12/2016 | Zhang et al. | |
| 2017/0117991 A1 | 4/2017 | Liu et al. | |
| 2017/0310431 A1* | 10/2017 | Iyer | H04L 1/1819 |
| 2020/0059327 A1* | 2/2020 | Kini | H04W 72/042 |
| 2020/0235864 A1* | 7/2020 | Li | H04L 1/1812 |
| 2020/0295878 A1* | 9/2020 | Choi | H04W 72/1273 |

OTHER PUBLICATIONS

ZTE, ZTE Microelectronics, "NR HARQ timing and feedback schemes", 3GPP TSG RAN WG1 Meeting #88, Feb. 13-17, 2017, R1-1701593.

Nokia, Alcatel-Lucent Shanghai Bell, "On the short PUCCH design for small UCI payloads", 3GPP TSG RAN WG1 NR Ad-Hoc #2, Jun. 27-30, 2017, R1-1710893.

NTT DoCoMo, Inc., "UL control signalling for CBG-based (re)transmissions", 3GPP TSG RAN WG1 NR Ad-Hoc#2, Jun. 27-30, 2017, R1-1711114.

Huawei, HiSilicon, "Simultaneous transmission of periodic CSI and HARQ-ACK in carrier aggregation", 3GPP TSG RAN WG1 Meeting #68bis, Mar. 26-30, 2012, R1-120967.

* cited by examiner (a) Conventional 1-bit ACK/NACK transmission scheme  (b) Proposed 1-bit ACK/NACK transmission scheme (a) Conventional 1-bit ACK/NACK decision region (b) Proposed 1-bit ACK/NACK decision region (a) Conventional QPSK decision region    (b) Proposed QPSK decision region

METHOD FOR HARQ ACK/NACK REPORTING IN WIRELESS COMMUNICATION SYSTEM AND APPARATUS THEREFOR

This application is a National Stage Entry of International Application No. PCT/KR2018/009131 filed Aug. 9, 2018, which claims the benefit of U.S. Provisional Application Nos. 62/543,960 filed Aug. 10, 2017 and 62/544,669 filed Aug. 11, 2017, all of which are hereby incorporated by reference in their entirety for all purposes as if fully set forth herein.

TECHNICAL FIELD

The present disclosure relates to a wireless communication system, and more particularly, to a method for reporting a hybrid automatic repeat request-acknowledgment/negative-acknowledgment (HARQ-ACK/NACK) and apparatus therefor.

BACKGROUND ART

The necessity for mobile broadband communication much improved than the conventional radio access technology (RAT) has increased as a number of communication devices has required higher communication capacity. In addition, massive machine type communications (MTC) capable of providing various services anytime and anywhere by connecting a number of devices or things to each other has been considered as a main issue in the next generation communications. Moreover, a communication system design capable of supporting services sensitive to reliability and latency has been discussed. The introduction of next-generation RAT considering enhanced mobile broadband communication (eMBB), massive MTC (mMTC), ultra-reliable and low latency communication (URLLC), etc. has been discussed. In the present disclosure, the corresponding technology is referred to as new RAT for convenience of description.

DISCLOSURE

Technical Problem

The object of the present disclosure is to provide a method for reporting a HARQ ACK/NACK.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an aspect of the present disclosure, provided herein is a method of reporting hybrid automatic repeat request-acknowledgment/negative-acknowledgment (HARQ-ACK/NACK) feedback in a wireless communication system, which is performed by a user equipment (UE). The method may include detecting downlink data and transmitting HARQ-ACK/NACK information for the downlink data. The HARQ-ACK/NACK information may include bits selected from a HARQ-ACK/NACK bit information set where the number of states of bits for representing an ACK is set to be different from the number of states of bits for representing a NACK.

Additionally or alternatively, the method may further include receiving information on the HARQ-ACK/NACK bit information set.

Additionally or alternatively, the power for transmitting the HARQ-ACK/NACK information may vary depending on whether the HARQ-ACK/NACK information indicates the ACK or the NACK.

Additionally or alternatively, the HARQ-ACK/NACK information may include bits for representing combined ACK/NACK information for a plurality of services. In addition, the HARQ-ACK/NACK information may include bits selected from a HARQ-ACK/NACK bit information set where the number of states of bits for representing the ACK for at least one of the plurality of services is set to be different from the number of states of bits for representing the NACK for at least one of the plurality of services.

Additionally or alternatively, the HARQ-ACK/NACK information may include joint-encoded bits with different types of uplink control information. In addition, the HARQ-ACK/NACK information may include bits selected from a HARQ-ACK/NACK bit information set where the number of states of bits for representing the ACK for at least one of the multiple types of uplink control information is set to be different from the number of states of bits for representing the NACK for at least one of the multiple types of uplink control information.

Additionally or alternatively, transmission power may be configured separately for each state of the HARQ-ACK/NACK information.

Additionally or alternatively, the method may include transmitting, to a base station, information on reliability or latency requirements for the transmission of the HARQ-ACK/NACK information.

Additionally or alternatively, the HARQ-ACK/NACK information may include bits for a plurality of code block groups for the downlink data. When a remainder obtained by dividing the number of the plurality of code block groups by the number of the bits is not zero, a HARQ-ACK/NACK bit for a transport block (TB) for the downlink data may be included in some of bits for a remaining number of code block groups.

In another aspect of the present disclosure, provided herein is a UE for reporting HARQ-ACK/NACK feedback in a wireless communication system. The UE may include a transmitter, a receiver, and a processor configured to control the transmitter and the receiver. The processor may be configured to detect downlink data and transmit HARQ-ACK/NACK information for the downlink data. The HARQ-ACK/NACK information may include bits selected from a HARQ-ACK/NACK bit information set where the number of states of bits for representing an ACK is set to be different from the number of states of bits for representing a NACK.

Additionally or alternatively, the processor may be configured to receive information on the HARQ-ACK/NACK bit information set.

Additionally or alternatively, the power for transmitting the HARQ-ACK/NACK information may vary depending on whether the HARQ-ACK/NACK information indicates the ACK or the NACK.

Additionally or alternatively, the HARQ-ACK/NACK information may include bits for representing combined ACK/NACK information for a plurality of services. In addition, the HARQ-ACK/NACK information may include bits selected from a HARQ-ACK/NACK bit information set where the number of states of bits for representing the ACK for at least one of the plurality of services is set to be different from the number of states of bits for representing the NACK for at least one of the plurality of services.

Additionally or alternatively, the HARQ-ACK/NACK information may include joint-encoded bits with different types of uplink control information. In addition, the HARQ-ACK/NACK information may include bits selected from a HARQ-ACK/NACK bit information set where the number of states of bits for representing the ACK for at least one of the multiple types of uplink control information is set to be different from the number of states of bits for representing the NACK for at least one of the multiple types of uplink control information.

Additionally or alternatively, transmission power may be configured separately for each state of the HARQ-ACK/NACK information.

Additionally or alternatively, the processor may be configured to transmit, to a base station, information on reliability or latency requirements for the transmission of the HARQ-ACK/NACK information.

Additionally or alternatively, the HARQ-ACK/NACK information may include bits for a plurality of code block groups for the downlink data. When a remainder obtained by dividing the number of the plurality of code block groups by the number of the bits is not zero, a HARQ-ACK/NACK bit for a TB for the downlink data may be included in some of bits for a remaining number of code block groups.

Additionally or alternatively, the UE is a part of an autonomous driving device that communicates with at least one of a network or another autonomous driving vehicle.

The above-described aspects of the present disclosure are merely parts of the embodiments of the present disclosure. It will be understood by those skilled in the art that various embodiments are derived from the following detailed description of the present disclosure without departing from the technical features of the disclosure.

Advantageous Effects

According to embodiments of the present disclosure, HARQ-ACK/NACK reporting may be efficiently processed.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DESCRIPTION OF DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

BEST MODE

Figure 1:
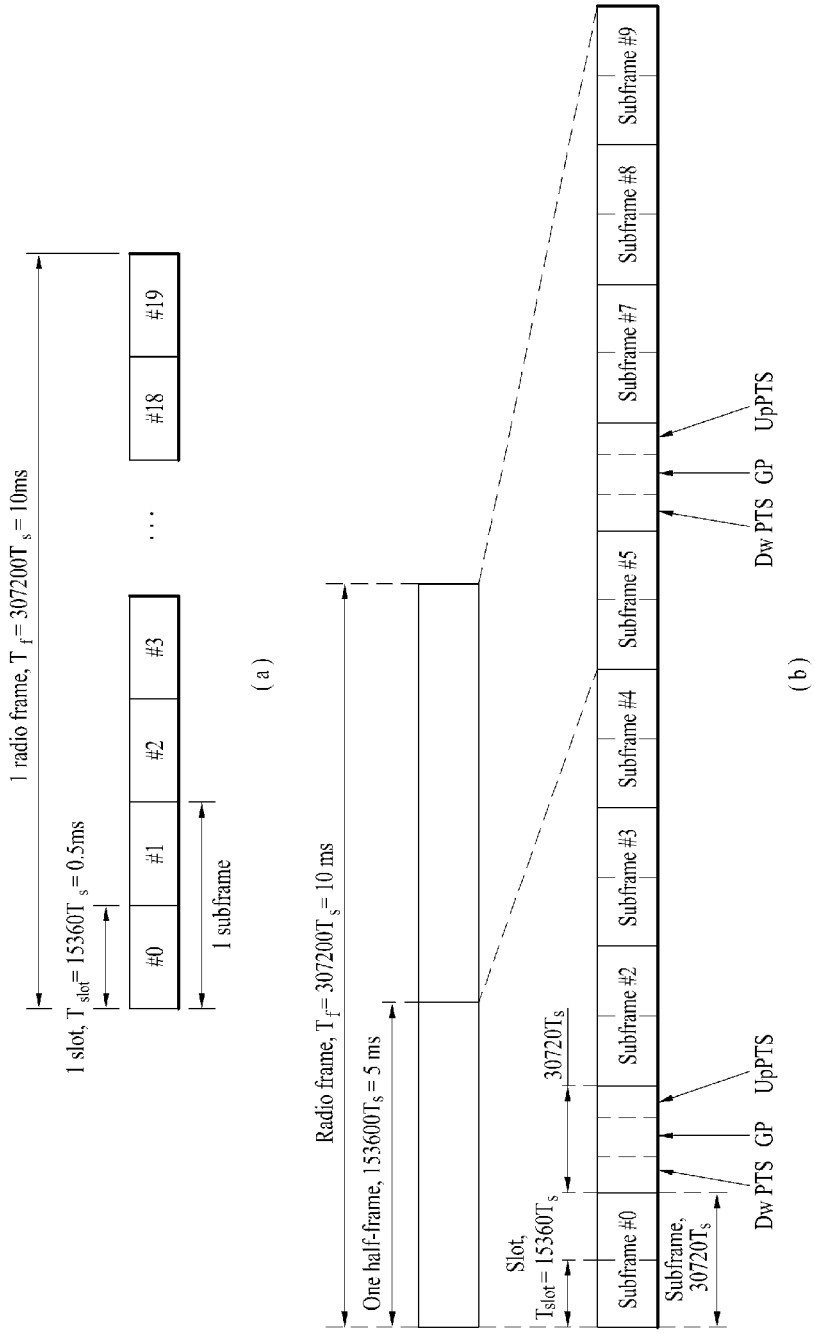
FIG. 1 is a diagram illustrating an exemplary radio frame structure used in a wireless communication system.

Reference will now be made in detail to the preferred embodiments of the present disclosure, examples of which are illustrated in the accompanying drawings. The accompanying drawings illustrate exemplary embodiments of the present disclosure and provide a more detailed description of the present disclosure. However, the scope of the present disclosure should not be limited thereto.

In some cases, to prevent the concept of the present disclosure from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present disclosure, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present disclosure, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g. macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present disclosure, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional multiple input multiple output (MIMO) systems, conventional relay systems, conventional repeater systems, etc.) since a plurality of nodes provides communication services to a UE in a predetermined time-frequency resource. Accordingly, embodiments of the present disclosure with respect to a method of performing coordinated data transmission using some or all nodes can be applied to various types of multi-node systems. For example, a node refers to an antenna group spaced apart from another node by a predetermined distance or more, in general. However, embodiments of the present disclosure, which will be described below, can even be applied to a case in which a node refers to an arbitrary antenna group irrespective of node interval. In the case of an eNB including an X-pole (cross polarized) antenna, for example, the embodiments of the present disclosure are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink (DL) signal is discriminated from a node transmitting an uplink (UL) signal is called multi-eNB MIMO or coordinated multi-point Tx/Rx (CoMP). Coordinated transmission schemes from among CoMP communication schemes can be categorized into joint processing (JP) and scheduling coordination. The former may be divided into joint transmission (JT)/joint reception (JR) and dynamic point selection (DPS) and the latter may be divided into coordinated scheduling (CS) and coordinated beamforming (CB). DPS may be called dynamic cell selection (DCS). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present disclosure, a cell refers to a specific geographical area in which one or more nodes provide communication services. Accordingly, communication with a specific cell may mean communication with an eNB or a node providing communication services to the specific cell. A DL/UL signal of a specific cell refers to a DL/UL signal from/to an eNB or a node providing communication services to the specific cell. A cell providing UL/DL communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure DL channel state from a specific node using one or more channel state information reference signals (CSI-RSs) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present disclosure, physical DL control channel (PDCCH)/physical control format indicator channel (PCFICH)/physical hybrid automatic repeat request indicator channel (PHICH)/physical DL shared channel (PDSCH) refer to a set of time-frequency resources or resource elements respectively carrying DL control information (DCI)/control format indicator (CFI)/DL acknowledgement/negative acknowledgement (ACK/NACK)/DL data. In addition, physical UL control channel (PUCCH)/physical UL shared channel (PUSCH)/physical random access channel (PRACH) refer to sets of time-frequency resources or resource elements respectively carrying UL control information (UCI)/UL data/random access signals. In the present disclosure, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of UL control information/UL data/random access signal through or on PUCCH/PUSCH/PRACH. Furthermore, transmission of PDCCH/PCFICH/PHICH/PDSCH by an eNB is equivalent to transmission of DL data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. DL transmission is discriminated from UL transmission by frequency in FDD mode, and thus the radio frame includes only one of a DL subframe and an UL subframe in a specific frequency band. In TDD mode, DL transmission is discriminated from UL transmission by time, and thus the radio frame includes both a DL subframe and an UL subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a DL subframe, U denotes an UL subframe and S denotes a special subframe. The special subframe includes three fields of DL pilot time slot (DwPTS), guard period (GP), and UL pilot time slot (UpPTS). DwPTS is a period reserved for DL transmission and UpPTS is a period reserved for UL transmission. Table 2 shows special subframe configuration.

TABLE 2

| | Normal cyclic prefix in DL | | | Extended cyclic prefix in DL | | |
|---|---|---|---|---|---|---|
| | | UpPTS | | | UpPTS | |
| Special subframe configuration | DwPTS | Normal cyclic prefix in UL | Extended cyclic prefix in UL | DwPTS | Normal cyclic prefix in UL | Extended cyclic prefix in UL |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Figure 2:
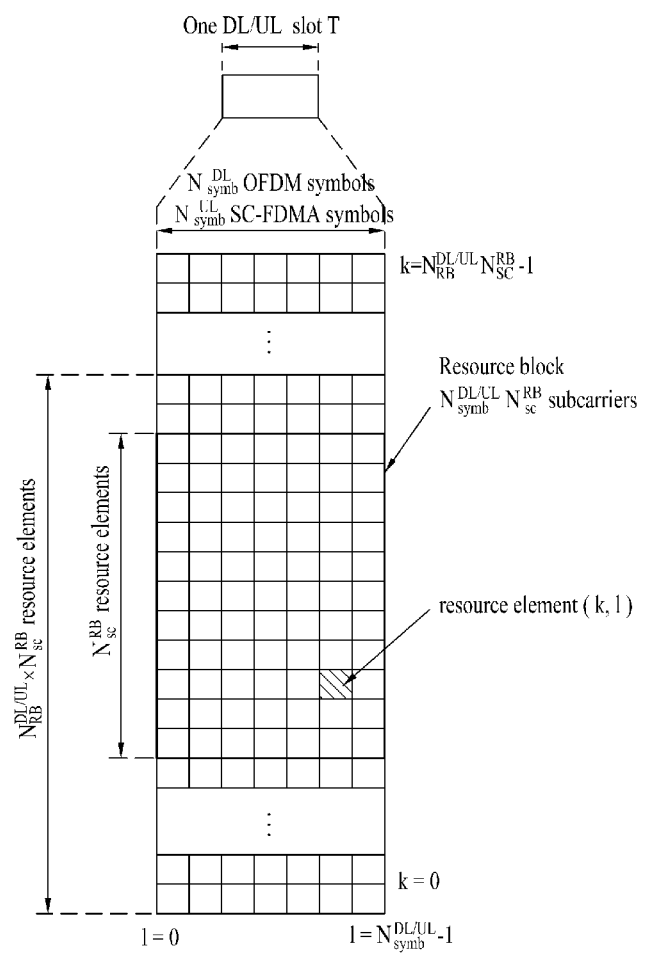
FIG. 2 is a diagram illustrating an exemplary downlink (DL)/uplink (UL) slot structure in a wireless communication system.

FIG. 2 illustrates an exemplary DL/UL slot structure in a wireless communication system. Particularly, FIG. 2 illustrates a resource grid structure in 3GPP LTE/LTE-A. A resource grid is present per antenna port.

Referring to FIG. 2, a slot includes a plurality of orthogonal frequency division multiplexing (OFDM) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a DL slot and $N_{RB}^{UL}$ denotes the number of RBs in an UL slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the DL slot and $N_{symb}^{UL}$ denotes the number of OFDM symbols in the UL slot. In addition, $N_{sc}^{RB}$ denotes the number of subcarriers constructing one RB.

An OFDM symbol may be called an single carrier frequency division multiplexing (SC-FDM) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present disclosure can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g. 7) consecutive OFDM symbols in the time domain and $N_{sc}^{RB}$ (e.g. 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$. Each RE in a resource grid can be uniquely defined by an index pair (k, l) in a slot. Here, k is an index in the range of 0 to $N_{symb}^{DL/UL} * N_{sc}^{RB} - 1$ in the frequency domain and l is an index in the range of 0 to $N_{symb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, $n_{PRB}=n_{VRB}$ is obtained. Numbers are given to the localized VRBs from 0 to $N_{VRB}^{DL}-1$, and $N_{VRB}^{DL}=N_{RB}^{DL}$ obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
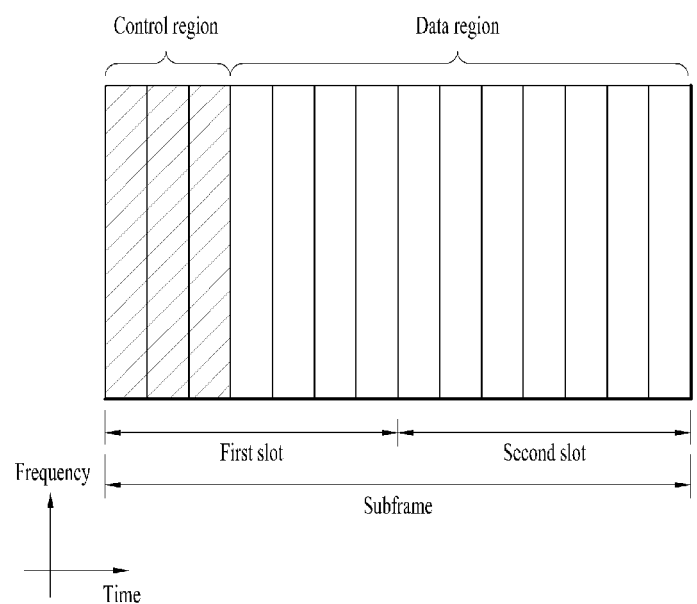
FIG. 3 is a diagram illustrating an exemplary DL subframe structure used in a $3^{rd}$ generation partnership project (3GPP) long term evolution (LTE)/long term evolution-advanced (LTE-A) system.

FIG. 3 illustrates a DL subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a PDSCH is allocated. A resource region available for PDSCH transmission in the DL subframe is referred to as a PDSCH region hereinafter. Examples of DL control channels used in 3GPP LTE include a PCFICH, a PDCCH, a PHICH, etc. The PCFICH is transmitted at a first OFDM symbol of a subframe and carries information regarding the number of OFDM symbols used for transmission of control channels within the subframe. The PHICH is a response of UL transmission and carries an HARQ ACK/NACK signal.

Control information carried on the PDCCH is called DCI. The DCI contains resource allocation information and control information for a UE or a UE group. For example, the DCI includes a transport format and resource allocation information of a DL shared channel (DL-SCH), a transport format and resource allocation information of an UL shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), DL assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for UL and formats 1, 1A, 1B, 1C, 1D, 2, 2A, 2B, 2C, 3 and 3A for DL, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| | Search Space | | |
|---|---|---|---|
| Type | Aggregation Level L | Size [in CCEs] | Number of PDCCH candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

A PDCCH candidate corresponds to 1, 2, 4 or 8 CCEs according to CCE aggregation level. An eNB transmits a PDCCH (DCI) on an arbitrary PDCCH candidate in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a PDSCH may be allocated to the data region. A PCH and DL-SCH are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is cyclic redundancy check (CRC)-masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of DL data for a specific UE is called a UE-specific RS. Both or one of DM RS and CRS may be transmitted on DL. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
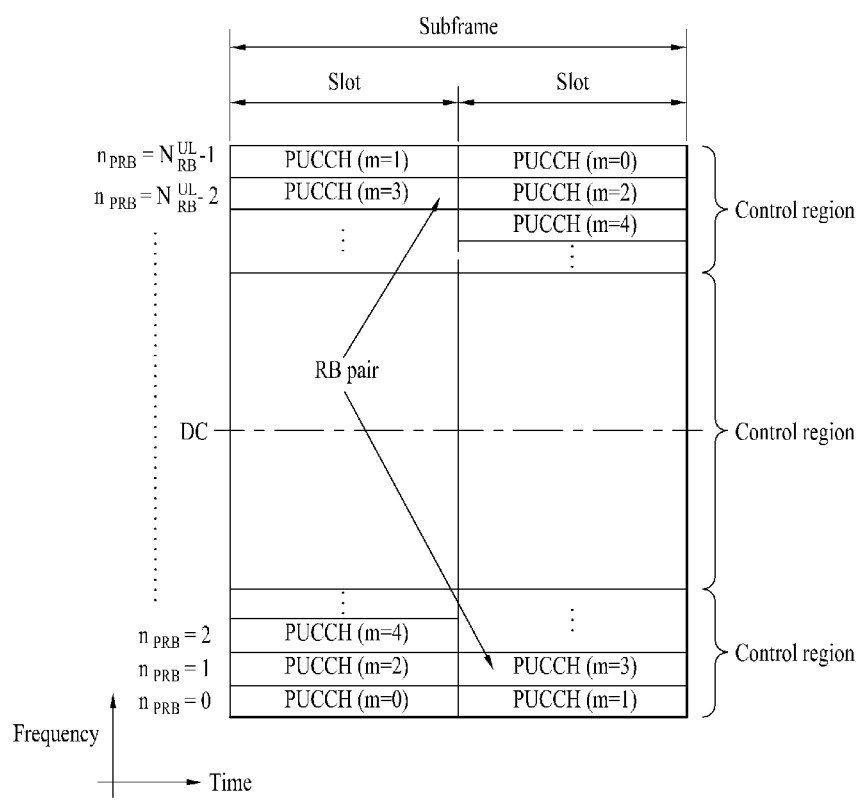
FIG. 4 is a diagram illustrating an exemplary UL subframe structure used in the 3GPP LTE/LTE-A system.

FIG. 4 illustrates an exemplary UL subframe structure used in 3GPP LTE/LTE-A.

Referring to FIG. 4, a UL subframe can be divided into a control region and a data region in the frequency domain. One or more PUCCHs (physical UL control channels) can be allocated to the control region to carry UCI. One or more PUSCHs may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a DL data packet on a PDSCH and indicates whether the DL data packet has been successfully received. A 1-bit ACK/NACK signal is transmitted as a response to a single DL codeword and a 2-bit ACK/NACK signal is transmitted as a response to two DL codewords. HARQ-ACK responses include positive ACK, NACK, discontinuous transmission (DTX) and NACK/DTX. Here, the term HARQ-ACK is used interchangeably with the term HARQ ACK/NACK and ACK/NACK.

Channel State Indicator (CSI): This is feedback information about a DL channel Feedback information regarding MIMO includes an RI and a PMI.

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
| --- | --- | --- | --- | --- |
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Reference Signal (RS)

When a packet is transmitted in a wireless communication system, signal distortion may occur during transmission since the packet is transmitted through a radio channel To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an UL reference signal and a DL reference signal. In LTE, the UL reference signal includes:

i) a demodulation reference signal (DMRS) for channel estimation for coherent demodulation of information transmitted through a PUSCH and a PUCCH; and ii) a sounding reference signal (SRS) used for an eNB to measure UL channel quality at a frequency of a different network.

The DL reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a DL DMRS is transmitted;

v) a multimedia broadcast single frequency network (MBSFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on DL transmission and received by a UE even if the UE does not receive DL data in a specific subframe. This reference signal is used even in a handover situation. The latter is transmitted along with a corresponding resource by an eNB when the eNB transmits a DL signal and is used for a UE to demodulate data through channel measurement. This reference signal needs to be transmitted in a region in which data is transmitted.

New Radio Technology (NR)

Now, a description will be given of a new radio access technology (RAT) system. As more and more communication devices demand larger communication capacities, the need for enhanced mobile broadband communication relative to legacy RATs has been pressing. There is also a need for massive machine type communication (MTC) which provides various services anytime, anywhere by connecting multiple devices and things to one another. Furthermore, a communication system reflecting services/UEs sensitive to reliability and latency has been designed.

A new RAT system has been proposed in consideration of enhanced mobile broadband communication, massive MTC, ultra-reliable and low-latency communication (URLLC), and so on. In the present disclosure, this technology is referred to as New RAT or New Radio (NR), for the convenience' sake.

An NR system to which the present disclosure is applicable supports various OFDM numerologies as listed in the following table. A subcarrier spacing (SCS) μ and CP information for each carrier bandwidth part (BWP) may be signaled on DL or UL. For example, an SCS and CP information for a DL carrier BWP may be signaled by higher-layer signaling, DL-BWP-mu and DL-MWP-cp. In another example, μ and CP information for a UL carrier BWP may be signaled by higher-layer signaling, UL-BWP-mu and UL-MWP-cp.

TABLE 5

| μ | $\Delta f = 2^\mu \cdot 15[\text{kHz}]$ | Cyclic prefix |
|---|---|---|
| 0 | 15 | Normal |
| 1 | 30 | Normal |
| 2 | 60 | Normal, Extended |

TABLE 5-continued

| μ | $\Delta f = 2^\mu \cdot 15[\text{kHz}]$ | Cyclic prefix |
|---|---|---|
| 3 | 120 | Normal |
| 4 | 240 | Normal |

In NR, a 10-ms frame is configured for DL transmission and UL transmission. The frame may include 10 1-ms subframes. The number of contiguous OFDM symbols per subframe is given by $N_{symb}^{subframe,\mu} = N_{symb}^{slot} N_{slot}^{subframe,\mu}$.

Each frame may include two equal-sized half frames. The half frames may include subframe 0 to subframe 4, and subframe 5 to subframe 9, respectively.

For an SCS μ, slots are numbered with $n_s^\mu \in \{0 \ldots, N_{slot}^{subframe,\mu}-1\}$ in an ascending order in a subframe, and with $n_{s,f}^\mu \in \{0, \ldots, N_{slot}^{frame,\mu}-1\}$ in an ascending order in a frame. The number $N_{symb}^{slot}$ of contiguous OFDM symbols in one slot may be determined as listed in the following table. The starting slot $n_s^\mu$ of a subframe is aligned in the time domain with the starting OFDM symbol $n_s^\mu N_{symb}^{slot}$ of the subframe. Table 4 below lists the numbers of OFDM symbols per slot/per frame/per subframe in a normal CP case, and Table 5 below lists the numbers of OFDM symbols per slot/per frame/per subframe in an extended CP case.

TABLE 6

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

TABLE 7

| μ | $N_{symb}^{slot}$ | $N_{slot}^{frame,\mu}$ | $N_{slot}^{subframe,\mu}$ |
|---|---|---|---|
| 2 | 12 | 40 | 4 |

The NR system to which the present disclosure is applicable may adopt a self-contained slot structure.

Figure 5:
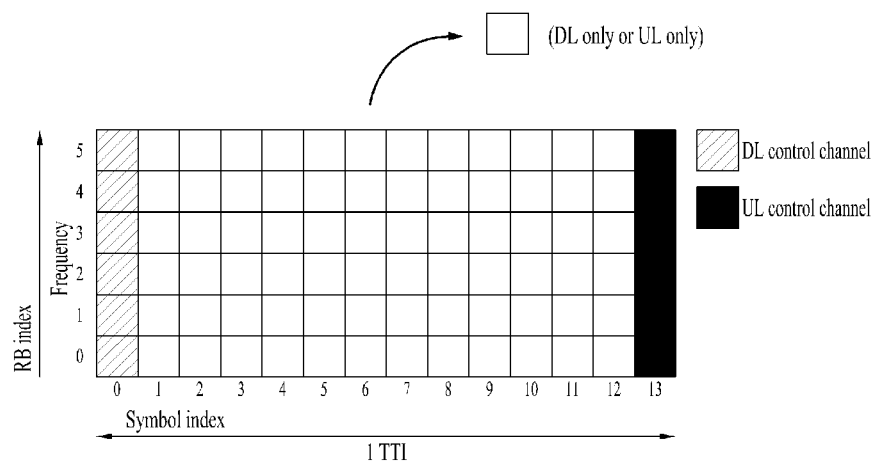
FIG. 5 is a diagram referred to for describing a self-contained structure in a new radio access technology (NR) system.

FIG. 5 is a diagram illustrating a self-contained slot structure applicable to the present disclosure.

In FIG. 5, the slashed area (e.g., symbol index=0) represents a DL control region, and the black area (e.g., symbol index=13) represents a UL control region. The remaining area (e.g., symbol index=1 to 12) may be used for DL or UL data transmission.

According to this structure, a BS and a UE may sequentially perform DL transmission and UL transmission in one slot. Further, the BS and the UE may transmit and receive DL data and a UL ACK/NACK for the DL data in the slot. When an error occurs during a data transmission, this structure may reduce a time taken for a data retransmission and thus minimize the latency of a final data transmission.

In this self-contained slot structure, there is a need for a time gap of a predetermined length for Tx-to-Rx or Rx-to-Tx switching of the BS and the UE. For this purpose, some OFDM symbol at the time of DL-to-UL switching may be configured as a guard period (GP) in the self-contained slot structure.

While the self-contained slot structure has been described above as including both of the DL control region and the UL control region, the control regions may be selectively included in the self-contained slot structure. In other words, the self-contained slot structure according to the present disclosure may include only the DL control region or the UL control region as well as both of the DL and UL control regions.

For example, a slot may be configured in various slot formats. In each slot, an OFDM symbol may be classified as DL (denoted by 'D'), flexible (denoted by 'X'), or UL (denoted by 'U').

Accordingly, the UE may assume that a DL transmission takes place only in 'D' and 'X' symbols. Likewise, the UE may assume that a UL transmission takes place only in 'U' and 'X' symbols.

Now, analog beamforming will be described.

In a millimeter wave (mmW), a wavelength is short, which enables installation of multiple antenna elements over the same area. That is, a total of 100 antenna elements may be installed in a two-dimensional array on a 5*5 cm panel at intervals of 0.5 lambda (wavelength) in a 30 GHz band with a wavelength of 1 cm. In mmW, therefore, coverage may be enhanced or throughput may be increased, by increasing a beamforming gain using multiple antenna elements in mmW.

Each antenna element may include a transceiver unit (TXRU) to enable transmission power control and phase control on an antenna element basis. Thus, each antenna element may perform independent beamforming in each frequency resource.

However, installation of TXRUs for all of about 100 antenna elements is not viable in terms of cost effectiveness. Accordingly, a method of mapping multiple antenna elements to one TXRU and controlling the direction of a beam by an analog phase shifter is under consideration. Because only one beam direction is generated across a total band, frequency selective beamforming is difficult in analog beamforming.

As a solution to the above problem, an intermediate scheme between digital beamforming and analog beamforming, hybrid beamforming may be considered, in which there are B TXRUs fewer than Q antenna elements. The number of the directions of beams which may be simultaneously transmitted is limited to B or less in hybrid beamforming, although the number of the directions of beams varies depending on how the B TXRUs are connected to the Q antenna elements.

Figure 6:
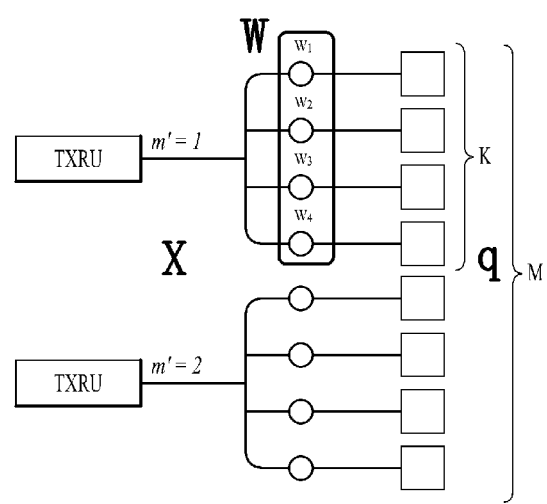
FIGS. 6 and 7 are diagrams referred to for describing schemes of connecting transceiver units (TXRUs) to antenna elements.
Figure 7:
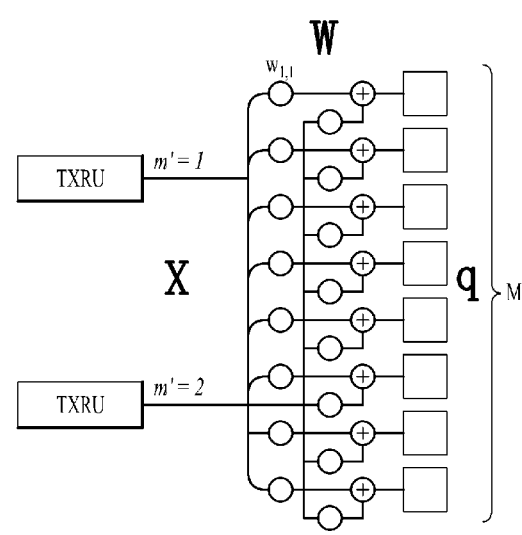

FIGS. 6 and 7 are diagrams illustrating representative methods of connecting TXRUs to antenna elements. The TXRU virtualization model represents the relationship between TXRU output signals and antenna element output signals.

FIG. 6 illustrates a method of connecting TXRUs to sub-arrays. In FIG. 6, one antenna element is connected only to one TXRU.

Figure 8:
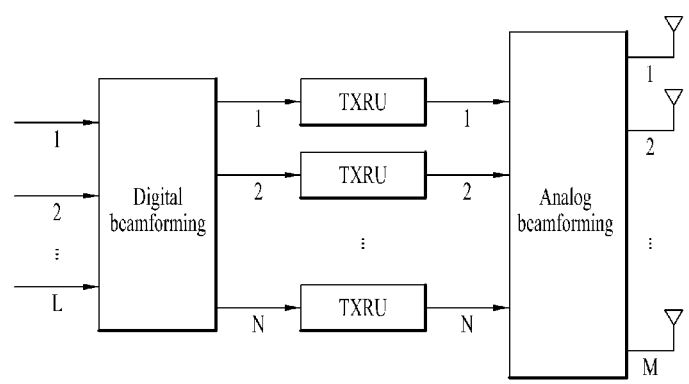
FIG. 8 is a diagram referred to for describing hybrid beamforming.

In contrast, FIG. 7 illustrates a method of connecting each TXRU to all antenna elements. In FIG. 7, each antenna element is connected to all TXRUs. To enable connection between each antenna element and all TXRUs, adders are additionally required, as illustrated in FIG. 8.

In FIGS. 6 and 7, W represents a phase vector weighted by an analog phase shifter. That is, W is a major parameter determining the direction of analog beamforming. In this case, CSI-RS antenna ports and TXRUs may be mapped in a one-to-one or one-to-many correspondence.

Despite difficult beamforming focusing, the configuration illustrated in FIG. 6 offers the benefit that an overall antenna configuration costs low.

On the contrary, the configuration illustrated in FIG. 7 advantageously facilitates beamforming focusing. However, because each TXRU is connected to all antenna elements, overall cost increases.

When a plurality of antennas is used in the NR system to which the present disclosure is applicable, hybrid beamforming with digital beamforming and analog beamforming in combination may be applied. Analog beamforming (or radio frequency (RF) beamforming) means an operation of performing precoding (or combining) at an RF end. In hybrid beamforming, each of a baseband end and an RF end perform precoding (or combining). Therefore, hybrid beamforming may advantageously achieve performance close to that of digital beamforming, with a smaller number of RF chains and a smaller number of digital-to-analog (D/A) (or analog-to-digital (A/D)) converters.

For the convenience of description, a hybrid beamforming structure may be represented by N TXRUs and M physical antennas. Digital beamforming for L data layers to be transmitted by a transmitter may be expressed as an N*L (N-by-L) matrix. Then, N converted digital signals are converted to analog signals via the TXRUs and then subjected to analog beamforming expressed as an M*N (M-by-N) matrix.

FIG. 8 is a diagram illustrating a simplified hybrid beamforming structure from the perspective of TXRUs and physical antennas. In FIG. 8, the number of digital beams is L and the number analog beams is N.

Additionally in the NR system, a method of designing a BS to change analog beamforming at a symbol level and thus support more efficient beamforming for a UE located in a specific area is under consideration. Furthermore, when N specific TXRUs and M RF antennas are defined as one antenna panel as illustrated in FIG. 8, the introduction of a plurality of antenna panels to which independent hybrid beamforming is applicable is under consideration in the NR system according to the present disclosure.

When the BS uses a plurality of analog beams as described above, different analog beams may be suitable for signal reception at different UEs. Therefore, in the NR system to which the present disclosure is applicable, a beam sweeping operation is considered, in which the BS transmits a signal (at least a synchronization signal, system information, paging, or the like) by applying a different analog beam to each symbol in as specific subframe (SF) so that all UEs may have reception opportunities.

The next-generation system aims to use wide frequency bands and support various services or requirements. For example, ultra-reliable and low-latency communications (URLLC), which is one of the representative scenarios, requires low latency and high reliability compliant with 3GPP NR requirements. Specifically, the URLLC requires support of user plane latency of 0.5 ms and transmission of X-byte data within 1 ms with an error rate less than $10^{-5}$. Generally, the traffic volume of enhanced mobile broadband (eMBB) is high, but the file size of URLLC traffic is less than tens or hundreds of bytes and the traffic sporadically occurs. Thus, for the eMBB, a transmission method capable of maximizing the transfer rate and minimizing the overhead of control information is required, but for the URLLC, a transmission method capable of using a short scheduling time unit and guaranteeing reliability is required.

Depending on application fields or traffic types, various reference time units may be assumed/used to transmit and receive a physical channel. The reference time unit may be a basic unit for scheduling a specific physical channel and vary depending on the number of symbols included in a corresponding scheduling unit and/or subcarrier spacing. In the present disclosure, a slot or a mini-slot is used as the reference time unit for convenience of description. The slot may refer to a basic scheduling unit used for normal data traffic (e.g., eMBB). The time duration of the mini-slot may be shorter than that of the slot in the time domain. The mini-slot may have a shorter time period than the slot in the time domain and refer to a basic scheduling unit used for special traffic or communication (e.g., URLLC, unlicensed band, millimeter wave, etc.). However, this is merely exemplary, and it is apparent that the present disclosure may be extended and applied when a physical channel is transmitted and received based on the mini-slot in the eMBB or when a physical channel is transmitted and received based on the slot in the URLLC or other communication methods.

The reliability of the HARQ-ACK needs to be improved to satisfy a reliability level of 10^-5. In this case, an ACK-to-NACK error (i.e., an error that occurs when a receiving device regards an ACK transmitted from a transmitting device as a NACK) may affect the reliability of the HARQ-ACK more than a NACK-to-ACK error (i.e., an error that occurs when a receiving device regards a NACK transmitted from a transmitting device as an ACK). For example, when a NACK is erroneously determined as an ACK, a BS may not perform retransmission due to the NACK. This may cause a problem that corresponding data is completely missed. Thus, the reduction of the NACK-to-ACK error is very important in the URLLC.

Extended Transmission and Asymmetric Decision of HARQ-ACK for URLLC

To improve the reliability of HARQ-ACK transmission, the present disclosure proposes to apply an asymmetric decision region to ACK/NACK reception. For the ACK/NACK reception, when an ACK/NACK is transmitted, the number of bits needs to be equal to or more than states capable of being expressed by an ACK/NACK bit(s) to be transmitted. For example, to configure the asymmetric decision region for a 1-bit ACK/NACK, two or more bits needs to be used in expressing states thereof. In other words, the 1-bit ACK/NACK needs to be extended to two bits and then transmitted.

As a simple ACK/NACK extension method, it may be considered that repetition is performed on a bit basis. For example, when the 1-bit ACK/NACK is transmitted, the ACK may be represented by bit=1 and the NACK may be represented by bit=0. However, in the case of the bit repetition, the ACK and the NACK may be represented by two bits as follows: bit=11 and bit=00, respectively. The bit repetition is illustrated in FIG. 5. Generally, when the A/N (ACK/NACK) is represented by X bits, the ACK may be represented as 11 . . . 1 (X bits) and the NACK may be represented by 00 . . . 0 (X bits). If a 1-bit or 2-bit HARQ-ACK is capable of being represented by a cyclic shift (CS), CSs representing X bits may be mapped for 1-bit HARQ-ACK transmission. For example, when the 2-bit HARQ-ACK is transmitted to improve the reliability of NACK transmission, the ACK may be mapped to 00 and the NACK may be mapped to other CSs except 00. Alternatively, the total PUCCH transmission power may increase when the NACK is transmitted.

Figure 9:
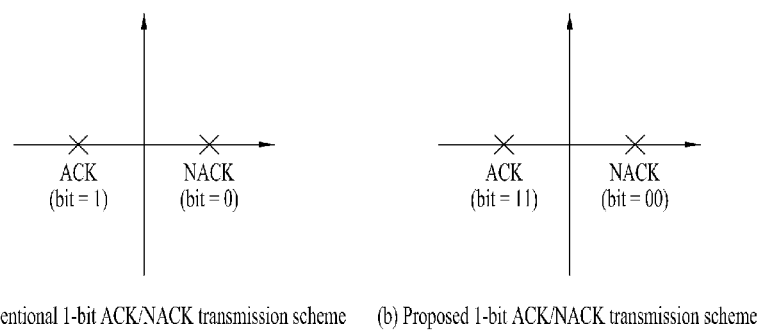
FIG. 9 illustrates modulation constellation points of ACK/NACK bits.

FIG. 9 illustrates examples of 1-bit ACK/NACK transmission. FIG. 9 (a) shows a conventional ACK/NACK transmission scheme, and FIG. 9 (b) shows an ACK/NACK transmission scheme proposed in the present disclosure. In both FIG. 9 (a) and FIG. 9 (b), the same constellation is used.

In a general case, two specific states of M-phase shift keying (M-PSK) (e.g., quadrature PSK (QPSK), 8-PSK, etc.) or M-quadrature amplitude modulation (M-QAM) (e.g., 4-QAM, etc.) may be used for ACK/NACK transmission. In this case, constellation points corresponding to the two specific states need to have the longest distance. This may be applied when the ACK/NACK is represented by two or more bits.

When a BS makes a decision after receiving the ACK/NACK corresponding to the two specific states, the BS may configure asymmetric decision regions for the ACK and NACK. For example, to reduce the NACK-to-ACK error, the decision region for the ACK may be set smaller than that for the NACK. On the contrary, to reduce the ACK-to-NACK error, the decision region for the NACK may be set smaller than that for the ACK. That is, when the decision region is configured as described above, latency and/or reliability may be improved without allocating additional transmission power and/or resources.

Figure 10:
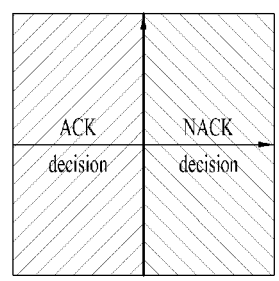
FIGS. 10 to 13 illustrate symmetric or asymmetric regions for ACK/NACK.
Figure 10:
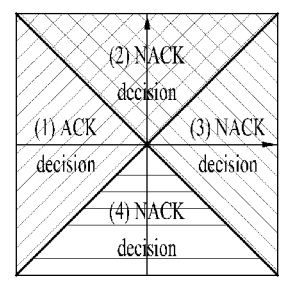

The decision regions used by the BS to detect the ACK/NACK shown in FIG. 9 are illustrated in FIG. 10. As shown in FIG. 10 (b), when the BS detects the 1-bit ACK/NACK, which is transmitted after applying the bit repetition thereto using two bits, the BS may reduce the NACK-to-ACK error by reducing the decision region where the ACK is determined (the decision region for the ACK).

FIG. 10 illustrates decision regions for the 1-bit ACK/NACK. Specifically, FIG. 10 (a) shows conventional 1-bit ACK/NACK decision regions. In this case, the decision region for the ACK is equal to that for the NACK. On the contrary, in FIG. 10 (b), the ACK is determined only when the result of decoding is included in (1). Thus, in FIG. 10 (b), the NACK-to-ACK error may decrease compared to FIG. 10 (a).

Table 8 below shows mapping between bit information and HARQ-ACK states.

TABLE 8

| Bit information, b(0)b(1) | HARQ-ACK(0) |
| --- | --- |
| 0, 0 | NACK |
| 0, 1 | NACK |
| 1, 1 | ACK |
| 1, 0 | NACK |

The above 2-bit HARQ-ACK transmission may be implemented by the use of a HARQ-ACK field in the existing PUCCH format (e.g., PUCCH format 1b). To distinguish the use of the HARQ-ACK field from the use of a normal 2-bit HARQ-ACK, the use of the HARQ-ACK field may be preconfigured or configured by higher layer signaling or explicit indication from the BS (e.g., DCI).

Although specific values are assumed for the constellation points and ACK/NACK states in the present disclosure, the constellation points and ACK/NACK states may vary. In addition, M bits (where M≥1) may be extended to N bits (where N≥1) and then transmitted, and the asymmetric decision may be applied thereto.

Meanwhile, the decision region may be adaptively adjusted to reduce the ACK-to-NACK error or the NACK-to-ACK error depending on service types or latency and/or reliability requirements. Alternatively, different decision regions may be configured for each ACK/NACK resource set.

Other states except the ACK and NACK states may be used to transmit soft ACK and NACK information. For example, when the total number of error bits is small although not the ACK, a pseudo ACK may be configured in the vicinity of the ACK state. That is, it may be considered that specific values are given to the other states. Additionally, it may be considered that this is applied when there are many error bits.

In the present disclosure, the following may be considered as a specific state/bit.

A resource corresponding to the specific state/bit may be configured. For example, when BPSK '1' is configured on the specific resource, it may be regarded as state '11'.

A hopping pattern corresponding to the specific state/bit may be configured. For example, when resource X is changed to resource Y (X→Y), the hopping pattern may be set to '1'. When Y→X, the hopping pattern may be set to '0'. When ACK '1' is transmitted in the case of X→Y, it may correspond to state '11'.

The specific state/bit may be considered as one data bit.

The specific state/bit may be connected to modulation. For example, when QPSK is used, it may be regarded that state '0' is included. When 16-QAM is used, it may be regarded that state '1' is included.

Signaling and Configuration for HARQ-ACK Reliability Enhancement

Figure 11:
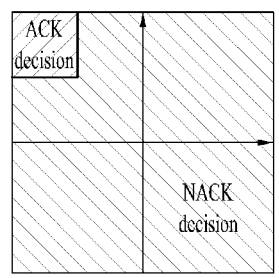
Figure 12:
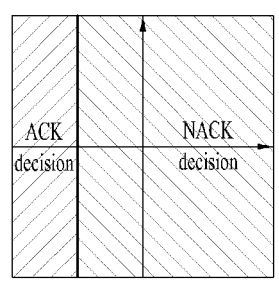

It may be considered that the decision region is adjusted in the case of high-order modulation. In the case of 16-QAM, since there are 16 ACK/NACK decision regions, the decision regions may be changed as follows if necessary. FIG. 11 shows an example of reducing the NACK-to-ACK error by adjusting a decision region(s) in 16-QAM, and FIG. 12 shows an example of reducing the NACK-to-ACK error by adjusting a decision region(s) in BPSK.

The decision regions for the ACK/NACK may be represented by a ratio. For example, in FIG. 11, the ratio is represented as ACK:NACK=1:15 or ACK/NACK=1/15. In FIG. 12, the ratio is represented as ACK:NACK=1:4 or ACK/NACK=1/4. In this case, a BS may transmit a values indicating the ACK/NACK decision regions (e.g., decision region ratio) to a UE, and upon receiving the value, the UE may estimate ACK/NACK transmission power from a predefined value or RRC signaling. When the CS are used to distinguish between the ACK and the NACK, that is, when the ACK and the NACK are distinguished from each other based on each CS value, it may be considered that the NACK-to-ACK error is reduced by setting a high detection threshold for a CS corresponding to the ACK (CS detection threshold). As a CS corresponding to the NACK, a CS with the longest distance between UEs may be used. In addition, adjacent CSs may be used to present the NACK and the ACK at one UE. This may be interpreted to mean that a CS which are easily distinguished between UEs and show the best performance are set to the CS corresponding the NACK.

The BS may instruct the UE to adjust its ACK/NACK transmission power depending on the service types or the latency and/or reliability requirements. Specifically, the UE may set different transmission power depending on whether the UE transmits the ACK or the NACK. The reason for this is to adjust the ACK-to-NACK error and the NACK-to-ACK error based on various reliability requirements. When a plurality of UEs are multiplexed, the above transmission power adjustment method may allow to distinguish between ACKs/NACKs from the UEs. In this case, information transmitted from the BS to the UE may include the absolute values of transmission power equally or differently applied to the ACK or NACK to be transmitted by the UE or a power ratio between the ACK and the NACK. The ACK/NACK power adjustment may be operatively connected to the ACK/NACK decision regions. Specifically, in the case of the NACK, the power may be set to 0. That is, in the case of the NACK, since network retransmission is allowed by DTX, the NACK may be dropped for UE power saving.

(1) The BS transmits the absolute value of ACK/NACK transmission power to the UE.

(2) The ACK/NACK transmission power of the UE may be predefined, and the BS may inform the UE of an offset such that the predefined power is multiplied by K or the value of A is added or subtracted to or from the predefined power.

The above transmission power adjustment may be configured by explicit indication (e.g., DCI) or higher layer signaling.

Joint Transmission for different service types of HARQ-ACK Using Multiple Bits

Although the present disclosure is described on the assumption that ACK/NACK bits are transmitted for one service (e.g., URLLC), the disclosure may be extended and applied when a UE simultaneously transmits ACKs/NACKs for services with different reliability requirements such as URLLC, eMBB, etc. For example, assuming that a total of three bits are used, a 1-bit ACK/NACK may be used for the URLLC and a 1-bit ACK/NACK may be used for the eMBB. Alternatively, the first two bits may be used to transmit the ACK/NACK for the URLLC, and the remaining one bit may be used to transmit the ACK/NACK for the eMBB. In this case, mapping between bit information and ACK/NACK states for each service may be performed shown in Table 9. Specifically, the number of HARQ-ACK bits may be changed for each service type. For example, in the case of the URLLC, every K bits (for example, K=2) may be used as HARQ-ACK bits, and in the case of the eMBB, every one bit may be used as HARQ-ACK bits.

TABLE 9

| Bit information, b(0)b(1)b(2) | HARQ-ACK(0) for URLLC | | HARQ-ACK(0) for eMBB | |
|---|---|---|---|---|
| 0, 0, 0 | HARQ-ACK(0)_URLLC | NACK | HARQ-ACK(0)_eMBB | ACK |
| 0, 1, 0 | HARQ-ACK(0)_URLLC | NACK | HARQ-ACK(0)_eMBB | ACK |
| 1, 1, 0 | HARQ-ACK(0)_URLLC | ACK | HARQ-ACK(0)_eMBB | ACK |
| 1, 0, 0 | HARQ-ACK(0)_URLLC | NACK | HARQ-ACK(0)_eMBB | ACK |
| 0, 0, 1 | HARQ-ACK(0)_URLLC | NACK | HARQ-ACK(0)_eMBB | NACK |
| 0, 1, 1 | HARQ-ACK(0)_URLLC | NACK | HARQ-ACK(0)_eMBB | NACK |
| 1, 1, 1 | HARQ-ACK(0)_URLLC | ACK | HARQ-ACK(0)_eMBB | NACK |
| 1, 0, 1 | HARQ-ACK(0)_URLLC | NACK | HARQ-ACK(0)_eMBB | NACK |

The above method may be applied when high-order modulation is used or when multiple resources are used for bit representation. In addition, the amount of resources for transmitting the 1-bit ACK/NACK information for the URLLC may be greater than the amount of resources for transmitting the 1-bit ACK/NACK information for the eMBB. When multiple PRBs or resources are allocated for UCI carrying the ACK/NACK, if the ACK/NACK for the URLLC and the ACK/NACK for the eMBB are mapped onto different resources, the power used for each resource and the allowed number of times of multiplexing may be adjusted.

For example, when ACK/NACK bits for the eMBB are transmitted, if a CS capable of multiplexing up to 8 UEs is used, the multiplexing capacity may be reduced to two UEs in the case of ACK/NACK bits for the URLLC. When resources are configured, the multiplexing capacity of the corresponding resources may be adjusted. Alternatively, the ACK/NACK transmission resources for the URLLC may be set separately from those for the eMBB, and a multiplexing technique and a power control parameter may be set differently for each resource. More specifically, the above parameter may depend on which ACK/NACK resource is configured. For example, when a UE transmits ACK/NACK bits for the eMBB, if the UE shares resources with a URLLC UE, the UE may need to adjust its transmission power suitable for the URLLC. This may be one of the best ways of improving the efficiency in consideration of multiplexing. Thus, the UE may be configured with not only multiple ACK/NACK resource sets but also parameters for power and multiplexing capacity for each resource set.

Meanwhile, the configurability of a PUCCH may be considered based on various reliability requirements. Specifically, if a UE supports various use cases, the UE may signal its capability of transmitting PUCCHs with various reliability and latency requirements. The various PUCCH requirements may be configured by multiple scheduling units or dynamically indicated by DL assignment.

In this case, when different service types are multiplexed, for example, when the UE simultaneously receives the URLLC and the eMBB, the UE may transmit multiple bits by adjusting the reliability requirement of the eMBB ACK/NACK with respect to the reliability requirement of the URLLC ACK/NACK. Alternatively, the UE may prioritize ACK/NACK transmission for a specific service based on the ACK/NACK priority of each service.

Joint Transmission of Different UCIs Using Multiple Bits

It may be considered that an ACK/NACK is simultaneously transmitted together with UCI using multiple bits. For example, in the case of a conventional SR, resources are configured only for a positive SR and a negative SR. However, simultaneous transmission may be configured as follows: positive SR+positive ACK, positive SR+negative ACK, negative SR+positive ACK, or negative SR+negative ACK. Alternatively, the SR may be presented by bits, and then the bits may be combined with ACK/NACK bits. For example, a 1-bit ACK/NACK may be simultaneously transmitted together with the SR as shown in Table 10 below.

TABLE 10

| Bit information, b(0)b(1) | 1-bit ACK or NACK | Positive or negative SR |
|---|---|---|
| 0, 0 | NACK | Negative SR |
| 0, 1 | NACK | Positive SR |
| 1, 0 | ACK | Negative SR |
| 1, 1 | ACK | Positive SR |

Figure 13:
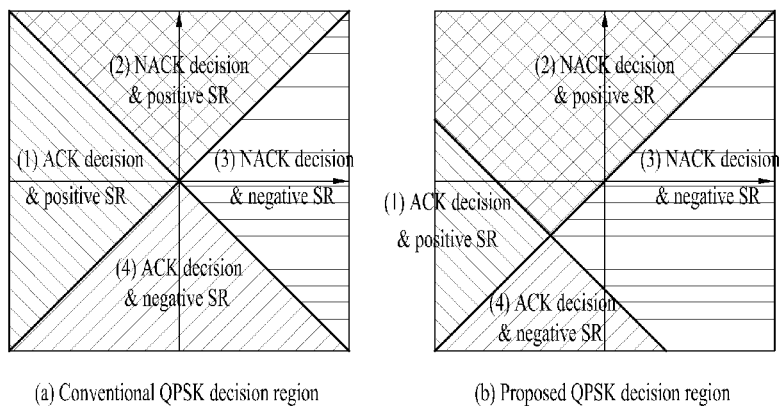

In this case, the reliability requirement may vary per UCI mapped to each bit depending on the service type. A BS may adjust decision regions such that the reliability requirement of UCI with high priority is satisfied. FIG. 13 (b) shows an example of decision regions capable of reducing the NACK-to-ACK error by reducing decision regions for the ACK when two bits are simultaneously transmitted, and more particularly, when a 1-bit ACK/NACK and a 1-bit SR are simultaneously transmitted. In addition, multiple bits may be used to transmit information as described above. For example, when two bits are used for ACK/NACK information and two bits are used for SR information, ACK decision regions may be reduced in the case of the ACK/NACK, and negative-SR decision regions may be reduced in the case of the SR. The reason for this is that in the case of the SR, the positive SR needs to be regarded as the normal one. If the negative and positive SRs are equally applied, a different number of information bits may be used for each service as in a case where the URLLC and the eMBB are multiplexed.

To this end, the UE may operate as follows. That is, the UE may change its transmission power depending on the reliability requirement of each UCI.

When multiple bits are transmitted for several UCIs, the transmission power for each state may be configured differently depending on the reliability requirement of each UCI.

» This method may be applied to when the following two bits: 1-bit ACK/NACK and 1-bit SR are simultaneously transmitted as shown in Table 10. In the case of the URLLC, since the NACK-to-ACK error and missing of the positive SR causes serious performance degradation, the reliability of both the NACK and the positive SR needs to be improved. Accordingly, when the UE transmits the bit state of (0, 1), the UE may increase its transmission power.

» The change of the transmission power for each state may be predefined or performed based on an additional power offset, which is configured by UE's signaling or higher layer signaling from the BS.

The UE may signal to the BS the reliability requirement of each UCI.

» For example, when the following two bits: 1-bit ACK/NACK and 1-bit SR are simultaneously transmitted as shown in Table 10, the UE may transmit to the BS the reliability requirement of each of the ACK/NACK and SR, and the BS may adjust decision regions based on the received reliability requirement.

The above-described method of signaling the reliability requirement of each UCI may be generalized as follows: the UE may signal to the BS the individual reliability requirements for all transmission channels and/or control information to satisfy URLLC service requirements.

In addition, when the SR is combined with the ACK/NACK, if different resources are used for the positive SR and the negative SR, the network may use DTX for SR detection. If the DTX shows better performance than bit transmission, the network may configure different resources for the ACK/NACK and instruct to transmit information on the SR using bits. This proposal may be applied when a multi-bit SR is transmitted. For example, different weights may be applied to information on the positive SR and additional information. Specifically, the number of cases where the SR is triggered but not detected may be reduced if the decision regions for the negative SR are reduced. For example, the following bit representation may be considered: bit 00=positive SR+additional information 0, bit 01=positive SR+additional information 1, bit 10=positive SR+additional information 0, and bit 11=negative SR. Other information may be represented using different power and modulation constellation points.

Although the present disclosure is described by assuming that different types of UCIs are simultaneously transmitted using multiple bits, the disclosure may be applied when one UE simultaneously receives different services (e.g., simultaneous reception of URLLC and eMBB) and then simultaneously transmits ACKs/NACKs using multiple bits (e.g., joint transmission of a 1-bit ACK/NACK for the URLLC and a 1-bit ACK/NACK for the eMBB).

In addition, the corresponding method may be used to increase the power depending on the number of NACK bits. Generally, the total UE power may be maintained at a constant level by decreasing the power depending on the number of ACK bits and increasing the power depending on the number of NACK bits. However, at the same time, the power used for the NACK transmission may be set higher than that used for the ACK transmission. This may be applied when a 1-bit HARQ-ACK is transmitted. Specifically, in the case of the 1-bit HARQ-ACK, different power may be allocated to the NACK transmission and the ACK transmission using a CS. In the case of multiple bits, power applied to all PUCCHs may be determined based on information in each bit. For example, the power may increase by delta*X depending on the number of bits including the NACK, and the power may decrease by delta-Y*Y depending on the number of bits including the ACK or DTX. Alternatively, when there is at least one NACK, the power may increase by K, and when there is no NACK, the power may decrease by K. That is, an offset may be applied to the transmission power based on the total SINR target in order to increase or decrease the power.

HARQ-ACK Feedback of Multiple CBGs Using Multiple Bits

In general, when an ACK/NACK bit(s) for a code block group (CBG) is transmitted K times (the number of CBGs are assumed to be K), the following may be considered for the ACK/NACK reliability of each CBG.

The proposal related to "asymmetric decision region" may be applied per ACK/NACK bit(s) of each CBG. In this case, if two bits are used per ACK/NACK, 2*K bits are required. Alternatively, if QPSK is used, K QPSK symbols are required.

Even when the present disclosure is not applied, each CBG may be transmitted based on QPSK or 16-QAM other than BPSK. In this case, modulation applied to each CBG may vary depending on the reliability. That is, the total number of bits and the modulation may vary depending on the reliability requirement.

Specifically, when the QPSK modulation is applied and the number of CBGs is an odd number, the last QPSK symbol may be used to represent the ACK/NACK state of the entire TB. For example, when the last CBG corresponds to the ACK and the TB also corresponds to the ACK, it may be considered that bits are set to 11 (bit=11). When the CBG corresponds to the ACK and the TB corresponds to the NACK, it may be considered that bits are set to 10 (bit=10).

When the 16-QAM is used and the number of CBGs is not a multiple of 4, the last 16-QAM symbol may be used to repeat the ACK/NACK of the entire TB or the ACKs/NACKs of the first N CBGs (where N<4), thereby improving the reliability. For example, when the 16-QAM modulation is applied and the number of CBGs is 9, ACK/NACK bits for the first 8 CBGs may be modulated using two 16-QAM symbols. In addition, one additional 16-QAM symbol may be used to select a state indicating the ACK/NACK bit of the last CBG and the ACK/NACK states of the entire TB, which are repeated three times, or a state obtained by combining the ACK/NACK states of the first three CBGs and the ACK/NACK state of a CBG.

M ACK/NACK bits may be added based on K+M. In this case, the M bits may be used to add the ACK/NACK of the TB as described in "asymmetric decision region" or repeating the ACK/NACK bits of CBGs by changing or maintaining the modulation.

Figure 14:
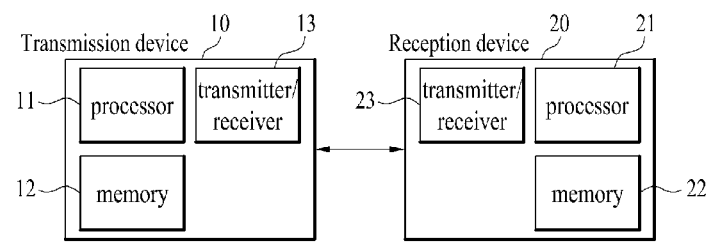
FIG. 14 is a block diagram illustrating devices configured to implement embodiment(s) of the present disclosure.

FIG. 14 is a block diagram of a transmitting device 10 and a receiving device 20 configured to implement exemplary embodiments of the present disclosure. The transmitting device 10 and the receiving device 20 respectively include transmitter/receiver 13 and 23 for transmitting and receiving radio signals carrying information, data, signals, and/or messages, memories 12 and 22 for storing information related to communication in a wireless communication system, and processors 11 and 21 connected operationally to the transmitter/receiver 13 and 23 and the memories 12 and 22 and configured to control the memories 12 and 22 and/or the transmitter/receiver 13 and 23 so as to perform at least one of the above-described embodiments of the present disclosure.

The memories 12 and 22 may store programs for processing and control of the processors 11 and 21 and may temporarily storing input/output information. The memories 12 and 22 may be used as buffers. The processors 11 and 21 control the overall operation of various modules in the transmitting device 10 or the receiving device 20. The processors 11 and 21 may perform various control functions to implement the present disclosure. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present disclosure is implemented using firmware or software, firmware or software may be configured to include modules, procedures, functions, etc. performing the functions or operations of the present disclosure. Firmware or software configured to perform the present disclosure may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the transmitter/receiver 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the transmitter/receiver 13 may include an oscillator.

The transmitter/receiver 13 may include Nt (where Nt is a positive integer) transmit antennas.

A signal processing process of the receiving device 20 is the reverse of the signal processing process of the transmitting device 10. Under the control of the processor 21, the transmitter/receiver 23 of the receiving device 10 receives RF signals transmitted by the transmitting device 10. The transmitter/receiver 23 may include Nr receive antennas and frequency down-converts each signal received through receive antennas into a baseband signal. The transmitter/receiver 23 may include an oscillator for frequency down-conversion. The processor 21 decodes and demodulates the radio signals received through the receive antennas and restores data that the transmitting device 10 wishes to transmit.

The transmitter/receiver 13 and 23 include one or more antennas. An antenna performs a function of transmitting signals processed by the transmitter/receiver 13 and 23 to the exterior or receiving radio signals from the exterior to transfer the radio signals to the transmitter/receiver 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. A transmitter/receiver supporting a MIMO function of transmitting and receiving data using a plurality of antennas may be connected to two or more antennas.

In embodiments of the present disclosure, a UE serves as the transmission device 10 on UL and as the receiving device 20 on DL. In embodiments of the present disclosure, an eNB serves as the receiving device 20 on UL and as the transmission device 10 on DL.

The transmitting device and/or the receiving device may be configured as a combination of one or more embodiments of the present disclosure.

As a combination of the above-described proposals, provided is a UE for reporting HARQ-ACK/NACK feedback in a wireless communication system. The UE may include a transmitter, a receiver, and a processor configured to control the transmitter and the receiver. The processor may be configured to detect DL data and transmit HARQ-ACK/NACK information for the DL data. The HARQ-ACK/NACK information may include bits selected from a HARQ-ACK/NACK bit information set where the number of states of bits for representing an ACK is set to be different from the number of states of bits for representing a NACK.

The processor may be configured to receive information on the HARQ-ACK/NACK bit information set.

The power for transmitting the HARQ-ACK/NACK information may vary depending on whether the HARQ-ACK/NACK information indicates the ACK or the NACK.

The HARQ-ACK/NACK information may include bits for representing combined ACK/NACK information for a plurality of services. In addition, the HARQ-ACK/NACK information may include bits selected from a HARQ-ACK/NACK bit information set where the number of states of bits for representing the ACK for at least one of the plurality of services is set to be different from the number of states of bits for representing the NACK for at least one of the plurality of services.

The HARQ-ACK/NACK information may include joint-encoded bits with different types of UCIs. In addition, the HARQ-ACK/NACK information may include bits selected from a HARQ-ACK/NACK bit information set where the number of states of bits for representing the ACK for at least one of the multiple types of UCIs is set to be different from the number of states of bits for representing the NACK for at least one of the multiple types of UCIs.

Transmission power may be configured separately for each state of the HARQ-ACK/NACK information.

The processor may be configured to transmit, to a BS, information on reliability or latency requirements for the transmission of the HARQ-ACK/NACK information.

The HARQ-ACK/NACK information may include bits for a plurality of CBGs for the DL data. When a remainder obtained by dividing the number of the plurality of CB Gs by the number of the bits is not zero, a HARQ-ACK/NACK bit for a TB for the DL data may be included in some of bits for a remaining number of CBGs.

The detailed descriptions of the preferred embodiments of the present disclosure are provided to allow those skilled in the art to implement and embody the present disclosure. While the present disclosure has been described and illustrated herein with reference to the preferred embodiments thereof, it will be apparent to those skilled in the art that various modifications and variations may be made therein without departing from the spirit and scope of the disclosure. Therefore, the present disclosure is not limited to the embodiments disclosed herein but intends to give the broadest scope consistent with the new principles and features disclosed herein.

INDUSTRIAL APPLICABILITY

The present disclosure may be used for a wireless communication apparatus such as a UE, a relay, and an eNB.

The invention claimed is:

1. A method of reporting hybrid automatic repeat request-acknowledgment (HARQ-ACK) feedback in a wireless communication system, the method performed by a user equipment (UE) and comprising:
    detecting downlink data; and
    transmitting HARQ-ACK information for the downlink data,
    wherein the HARQ-ACK information comprises N bits and provides a HARQ-ACK status among $2^N$ HARQ-ACK statuses, and
    wherein, among the $2^N$ HARQ-ACK statuses, M HARQ-ACK statuses are used for ACK and ($2^N-M$) HARQ-ACK statuses are used for negative acknowledgment (NACK),
    wherein M is equal to or greater than 1 and N is equal to or greater than 2,
    wherein M and N are positive integers, and
    wherein a number of the ($2^N-M$) HARQ-ACK statuses is greater than a number of the M HARQ-ACK statuses.

2. The method of claim 1, further comprising: receiving information related to the $2^N$ HARQ-ACK statuses.

3. The method of claim 1, wherein power for transmitting the HARQ-ACK information varies based on whether the HARQ-ACK information is ACK or NACK.

4. The method of claim 1, further comprising: transmitting, to a base station, information related to reliability or latency requirements for the transmission of the HARQ-ACK information.

5. The method of claim 1,
wherein the HARQ-ACK information comprises bits for a plurality of code block groups (CBGs) for the downlink data, and
wherein, based on a remainder being obtained by dividing a number of the plurality of CBGs by a number of the bits is not zero, a HARQ-ACK bit for a transport block (TB) for the downlink data is included amongst bits for a remaining number of code block groups.

6. The method of claim 1,
wherein the N bits are used for combined HARQ-ACK information for a first service and a second service,
wherein, among the 2N HARQ-ACK statuses, a number of the HARQ-ACK statuses for NACK of the first service is greater than a number of the HARQ-ACK statuses for ACK for the first service, and
wherein, among the 2N HARQ-ACK statuses, a number of the HARQ-ACK statuses for NACK of the second service is the same with a number of the HARQ-ACK statuses for ACK for the second service.

7. A user equipment (UE) configured for reporting hybrid automatic repeat request-acknowledgment (HARQ-ACK) feedback in a wireless communication system, the UE comprising:
a transmitter;
a receiver; and
a processor configured to control the transmitter and the receiver,
wherein the processor is further configured to:
detect downlink data; and
transmit HARQ-ACK information for the downlink data,
wherein the HARQ-ACK information comprises N bits and provides a HARQ-ACK status among $2^N$ HARQ-ACK statuses, and
wherein, among the $2^N$ HARQ-ACK statuses, M HARQ-ACK statuses are used for ACK and ($2^N$–M) HARQ-ACK statuses are used for negative acknowledgement (NACK),
wherein M is equal to or greater than 1 and N is equal to or greater than 2,
wherein M and N are positive integers, and
wherein a number of the ($2^N$–M) HARQ-ACK statuses is greater than a number of the M HARQ-ACK statuses.

8. The UE of claim 7, wherein the processor is further configured to receive information related to the $2^N$ HARQ-ACK statuses.

9. The UE of claim 7, wherein power for transmitting the HARQ-ACK information varies based on whether the HARQ-ACK/NACK information is ACK or NACK.

10. The UE of claim 7, wherein the processor is further configured to transmit, to a base station, information related to reliability or latency requirements for the transmission of the HARQ-ACK information.

11. The UE of claim 7,
wherein the HARQ-ACK/NACK information comprises bits for a plurality of code block groups (CBGs) for the downlink data, and
wherein, based on a remainder being obtained by dividing a number of the plurality of CBGs by a number of the bits is not zero, a HARQ-ACK bit for a transport block (TB) for the downlink data is included amongst bits for a remaining number of code block groups.

12. The UE of claim 7,
wherein the N bits are used for combined HARQ-ACK information for a first service and a second service,
wherein, among the $2^N$ HARQ-ACK statuses, a number of the HARQ-ACK statuses for NACK of the first service is greater than a number of the HARQ-ACK statuses for ACK for the first service, and
wherein, among the $2^N$ HARQ-ACK statuses, a number of the HARQ-ACK statuses for NACK of the second service is the same with a number of the HARQ-ACK statuses for ACK for the second service.

* * * * *